United States Patent
Detroja et al.

(10) Patent No.: US 11,500,923 B2
(45) Date of Patent: Nov. 15, 2022

(54) SYSTEMS AND METHODS FOR GENERATING INTERACTIVE MUSIC CHARTS

(71) Applicant: Meta Platforms, Inc., Menlo Park, CA (US)

(72) Inventors: Parth Popatlal Detroja, Redwood City, CA (US); Fred J. Beteille, Jr., Northport, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 205 days.

(21) Appl. No.: 16/525,195

(22) Filed: Jul. 29, 2019

(65) Prior Publication Data

US 2021/0034664 A1 Feb. 4, 2021

(51) Int. Cl.
*G06F 16/00* (2019.01)
*G06F 16/638* (2019.01)
*G06F 16/632* (2019.01)
*G06F 16/687* (2019.01)
*G06F 16/64* (2019.01)

(52) U.S. Cl.
CPC .......... *G06F 16/639* (2019.01); *G06F 16/632* (2019.01); *G06F 16/64* (2019.01); *G06F 16/687* (2019.01)

(58) Field of Classification Search
CPC .... G06F 16/639; G06F 16/632; G06F 16/687; G06F 16/64; G06F 16/686; G06F 16/635
See application file for complete search history.

(56) References Cited

U.S. PATENT DOCUMENTS

| | | | |
|---|---|---|---|
| 8,683,068 B2 | 3/2014 | Jalili et al. | |
| 10,345,998 B2 | 7/2019 | Sessak et al. | |
| 10,515,133 B1* | 12/2019 | Sharifi | G06F 16/48 |
| 2002/0152278 A1* | 10/2002 | Pontenzone | H04H 20/46 |
| | | | 709/217 |
| 2003/0236695 A1* | 12/2003 | Litwin, Jr. | G06Q 30/0201 |
| | | | 705/7.29 |
| 2008/0091717 A1* | 4/2008 | Garbow | G11B 27/105 |
| 2008/0127812 A1* | 6/2008 | Sako | H04N 21/6547 |
| | | | 84/625 |
| 2008/0155627 A1* | 6/2008 | O'Connor | H04N 21/84 |
| | | | 348/E7.069 |
| 2008/0163119 A1 | 7/2008 | Kim et al. | |
| 2009/0100093 A1* | 4/2009 | Makipaa | G06F 16/68 |
| 2010/0070917 A1* | 3/2010 | Gates | G06F 16/634 |
| | | | 715/810 |
| 2010/0275120 A1 | 10/2010 | Pappas | |

(Continued)

OTHER PUBLICATIONS

Bharathi, Isaac, "Configuring & Managing Alerts and Notifications Using Director", Desktop Virtualization (VDI) Blog, Feb. 16, 2016 (Year: 2016), 27 pages.

*Primary Examiner* — Syed H Hasan
(74) *Attorney, Agent, or Firm* — Sheppard Mullin Richter & Hampton LLP (57) ABSTRACT

Systems, methods, and non-transitory computer-readable media can be configured to determine popularity scores for a set of audio content items. The set of audio content items can be ranked based at least in part on the popularity scores, the popularity scores based at least in part on signals associated with a social networking system. A music chart can be generated based at least in part on the ranking.

20 Claims, 7 Drawing Sheets

(56) References Cited

U.S. PATENT DOCUMENTS

| | | | |
|---|---|---|---|
| 2010/0318544 A1* | 12/2010 | Nicolov | H04N 21/252 707/759 |
| 2013/0097014 A1* | 4/2013 | Martin | G06Q 30/0247 705/14.46 |
| 2013/0275506 A1* | 10/2013 | Warner | G06Q 10/10 709/204 |
| 2013/0282486 A1* | 10/2013 | Rahle | G06Q 30/0625 705/14.53 |
| 2014/0020116 A1 | 1/2014 | Chastagnol et al. | |
| 2014/0095291 A1* | 4/2014 | Dey | G06Q 30/0239 705/14.39 |
| 2014/0324885 A1* | 10/2014 | McKenzie | G06F 16/686 707/748 |
| 2015/0301718 A1 | 10/2015 | Trollope et al. | |
| 2017/0193100 A1* | 7/2017 | Bowery | H04L 67/306 |
| 2018/0189391 A1* | 7/2018 | Ip | G06F 16/635 |
| 2020/0034385 A1 | 1/2020 | Blum | |

\* cited by examiner

SYSTEMS AND METHODS FOR GENERATING INTERACTIVE MUSIC CHARTS

FIELD OF THE INVENTION

The present technology relates to the field of digital content platforms. More particularly, the present technology relates to generating interactive music charts.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item. In some cases, the shared content item can include music.

SUMMARY

Various embodiments of the present technology can include systems, methods, and non-transitory computer readable media configured to determine popularity scores for a set of audio content items. The set of audio content items can be ranked based at least in part on the popularity scores, the popularity scores based at least in part on signals associated with a social networking system. A music chart can be generated based at least in part on the ranking.

In an embodiment, the signals associated with the social networking system include at least one of: production signals, consumption signals, or engagement signals associated with the set of audio content items.

In an embodiment, the production signals are based at least in part on numbers of created content items associated with the set of audio content items.

In an embodiment, the consumption signals are based at least in part on numbers of instances of access of content items associated with the set of audio content items.

In an embodiment, the engagement signals are based at least in part on numbers of comments associated with content items associated with the set of audio content items.

In an embodiment, the popularity scores are further based at least in part on weights relating to at least one of: time factors or signal type factors.

In an embodiment, a shortcut that provides access to the music chart can be generated, wherein the shortcut is generated based at least in part on a search involving a trigger word.

In an embodiment, the music chart includes social connection information associated with a user.

In an embodiment, the music chart includes at least one interaction that involves generation of a new content item based at least in part on one of the set of audio content items.

In an embodiment, the ranking is further based at least in part on a geographic region.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Generating Interactive Music Charts

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item. In some cases, the shared content item can include music.

Under conventional approaches, a user can share and access a variety of content items, such as images, videos, articles, and links, provided by a content delivery platform (e.g., social networking system). For example, a user can access different content items by navigating to various pages on a social networking system. The user can interact with the content items in a variety of ways, such as by posting comments associated with the content items. Some content items can include music, and the music can be included in a variety of ways. For example, a video content item can include a portion of a song published by a musical artist. A user can access a variety of content items that include a variety of music through a social networking system. In some cases, a user can be interested in music and access a social networking system to discover what music is popular on the social networking system. The user can also be interested in interacting with music that is popular on the social networking system. However, under conventional approaches, users cannot readily discover what music is popular on a social networking system. Further, conventional approaches fail to provide users with user interfaces that present information associated with music and that allow direct interactions with the music. Accordingly, conventional approaches are ineffective in addressing these and other problems arising in computer technology.

An improved approach rooted in computer technology overcomes the foregoing and other disadvantages associated with conventional approaches specifically arising in the realm of computer technology. In various embodiments, the present technology provides for generating a music chart that provides a ranking of music. The music can include audio content items (e.g., songs). The music chart can be provided through a page on a social networking system. Users of the social networking system can access the page by directly navigating to the page or, in some cases, performing a search for music related topics, such as songs or artists that are represented in the music chart. The music chart can provide a ranking of music based on popularity. Popularity of music can be determined based on various signals associated with the social networking system. Such signals can include production signals (e.g., using music to create a content item), consumption signals (e.g., accessing a content item that includes music), and engagement signals (e.g., posting a comment associated with a content item that includes music). The signals can be weighted based on various factors, such as time factors (e.g., time associated with a signal) and signal type factors (e.g., type of signal). In addition to providing a ranking of music, the music chart can present information associated with the music and provide for various interactions with the music. The information can include, for example, a song title and artist name associated with the music as well as social connections that like (or endorse) the music. The interactions can include, for example, playing a clip of the music and generating and sharing a new content item based on the music. For example, a user can search for a popular artist on a social networking system, and the user can be presented with search results that include a shortcut to a music chart. The user can access the music chart through the shortcut, and the music chart can provide the user with a ranking of music. In this example, the ranking can be based on a number of times the music was utilized in content items published to the social networking system. The highest ranked song in the music chart can be a song that was used the most number of times in content items published to the social networking system, and lower ranked songs in the music charts can be songs that were used a fewer number of times in content items published to the social networking system. The user can interact with the music chart and listen to a clip of each song in the music chart. More details relating to the present technology are provided below.

Figure 1:
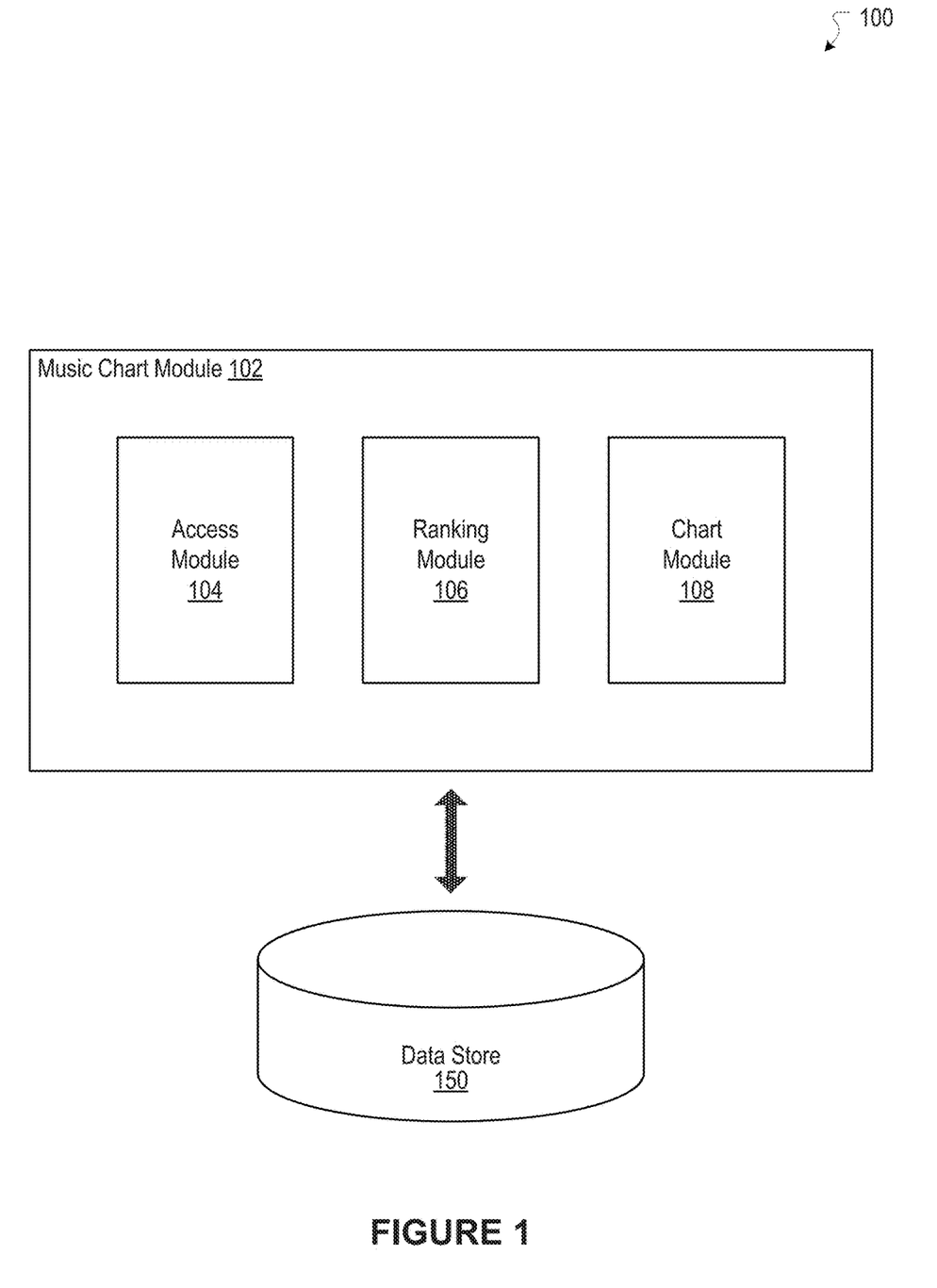
FIG. 1 illustrates an example system including a music chart module, according to an embodiment of the present technology.

FIG. 1 illustrates an example system 100 including a music chart module 102, according to an embodiment of the present technology. As shown in the example of FIG. 1, the music chart module 102 can include an access module 104, a ranking module 106, and a chart module 108. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the music chart module 102 can be implemented in any suitable combinations.

In some embodiments, the music chart module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the music chart module 102 can be, in part or in whole, implemented as software running on one or more computing devices or systems, such as on a server system or a client computing device. In some instances, the music chart module 102 can be, in part or in whole, implemented within or configured to operate in conjunction with or be integrated with a social networking system (or service), such as a social networking system 630 of FIG. 6. Likewise, in some instances, the music chart module 102 can be, in part or in whole, implemented within or configured to operate in conjunction with or be integrated with a client computing device, such as the user device 610 of FIG. 6. For example, the music chart module 102 can be implemented as or within a dedicated application (e.g., app), a program, or an applet running on a user computing device or client computing system. The application incorporating or implementing instructions for performing functionality of the music chart module 102 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The music chart module 102 can be configured to communicate and/or operate with the at least one data store 150, as shown in the example system 100. The at least one data store 150 can be configured to store and maintain various types of data. In some implementations, the at least one data store 150 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the at least one data store 150 can store information that is utilized by the music chart module 102. For example, the at least one data store 150 can store information associated with music rankings. It is contemplated that there can be many variations or other possibilities.

In various embodiments, the access module 104 can provide a link for accessing a music chart. In general, a music chart can be accessed through a page on a social networking system, and the page can be associated with a Uniform Resource Locator (URL). A user can access the page directly by utilizing the URL or by utilizing a link that directs the user to the page. The access module 104 can provide a shortcut that directs a user to a page presenting a music chart. The shortcut can include one or more links to the page presenting the music chart. The shortcut can also include a message indicating that the one or more links are links to the page presenting the music chart. The shortcut can be provided in response to a search that includes trigger words associated with an interest in music, and the shortcut can be provided as part of a search result in response to the search. Trigger words can include words associated with music-related topics. For example, trigger words can include "music," "music chart," "music news," "new music," "trending music," "popular songs," "popular musicians," and "new artists," as just a few examples. Trigger words can also include words associated with music currently or previously on a music chart. Such trigger words can include, for example, song titles, song lyrics, and artist names associated with music that is currently or previously on a music chart. Trigger words can also include portions of song titles, song lyrics, and artist names associated with music that is currently or previously on a music chart. In some cases, trigger words can include song titles, song lyrics, artist names, and portions thereof associated with a threshold number of songs (e.g., 100 songs, 1000 songs) or associated with a threshold number of artists (e.g., 100 artists, 1000 artists) that have been on a music chart. For example, a user can be interested in discovering new music and perform a search using a search term "new music." In this example, the search term "new music" can be a trigger word that, in response to a search on the term, provides a shortcut that directs the user to a page presenting a music chart. The user can be provided with the shortcut along with search results based on the search term. The shortcut can include a link to visit the page presenting the music chart. The user can click the link and access the page. Many variations are possible.

In various embodiments, the ranking module 106 can generate a ranking of music based on popularity. The music can include audio content items (e.g., songs). Popularity of a song can be reflected in a popularity score associated with the song. A song with a higher popularity score can be considered to be more popular than a song with a lower popularity score. A popularity score can be determined based at least in part on one or more signals associated with a social networking system. The signals can include production signals, consumption signals, and engagement signals. Production signals can be associated with use of music in creating content items. Production signals can be based at least in part on a number of times a song has been used to create a content item or a number of created content items that include the song. A song associated with a higher number of created content items that include the song can be associated with a stronger production signal (and a higher popularity score) than a song associated with a lower number of created content items. Production signals can also be based at least in part on how much of a song (e.g., 5 second clip, 30 second clip, entire song) has been included in a content item. A content item that includes a larger portion of a song can be associated with a stronger production signal (and a higher popularity score) than a content item that includes a smaller portion of the song. In some cases, a social networking system can offer an audio library of music for users to include when creating content items. The audio library can provide songs or portions of songs for users to include when creating content items. In such cases, production signals can be based at least in part on numbers of content items created through the social networking system that include a song and content items created without use of the social networking system that include the song. Consumption signals can be associated with access of content items that include music. Consumption signals can be based at least in part on a number of times content items that include a song have been accessed, viewed, or consumed. A song associated with a higher number of instances of access can be associated with a higher consumption signal (and a higher popularity score) than a song associated with a lower number of instances of access. In some cases, a content item may not be fully consumed, and consumption signals can be based at least in part on whether a song included in a content item was fully consumed and how much of the song was consumed. A content item that includes a song that was not fully consumed can be associated with a weaker consumption signal (and a lower popularity score) than a content item where the song was fully consumed. Engagement signals can be associated with interactions with content items that include music. Engagement signals can be based at least in part on a number of times a content item that includes a song was liked, loved, shared, commented on, or otherwise engaged with. For example, a song associated with a higher number of likes can be associated with a stronger engagement signal (and a higher popularity score) than a song associated with a lower number of likes. In some cases, a comment associated with a content item may not be related to a song included in the content item. In such cases, engagement signals can be based at least in part on whether a comment associated with a content item includes words associated with a song included in the content item. A content item associated with a comment that includes words associated with a song included in the content item can be associated with a stronger engagement signal (and a higher popularity score) than a content item associated with a comment that does not include words associated with the song. For example, a first song can be included in 100,000 content items created by users. The first song can be associated with 500,000 instances of access associated with the 100,000 content items. The first song can also be associated with 1,000,000 likes associated with the 100,000 content items. Based on the number of content items created by users, the number of instances of access, and the number of likes associated with the first song, a first popularity score can be determined for the first song. The first popularity score can be higher than a second popularity score associated with a second song that is associated with 50,000 content items created by users, 100,000 instances of access, and 200,000 likes. Many variations are possible.

Production signals, consumption signals, and engagement signals can be weighted based on one or more factors. The factors can include time factors and signal type factors. Time factors (or weights) can weigh signals associated with more recently created content items, more recent instances of access, and more recent interactions greater than signals associated with less recently created content items, less recent instances of access, and less recent interactions. In some cases, a popularity score can be based on signals that satisfy a threshold recency (e.g., 24 hours, 7 days, etc.). Signal type factors (or weights) can weigh signals associated with some types greater than signals associated with other types. In some cases, production signals can be weighed greater than engagement signals, and engagement signals can be weighed greater than consumption signals. As just one example, a popularity score associated with a song can be based on a number of user generated content items and a number of content items generated using an audio library, as described above. A formula for calculating the popularity score associated with the song can be:

$$0.6*(UGC_{24}+AL_{24})+0.4*(UGC_7+AL_7)$$

where $UGC_{24}$ is a number of user generated content items, generated without use of an audio library, generated within the past 24 hours; $AL_{24}$ is a number of content items generated using the audio library within the past 24 hours; $UGC_7$ is a number of user generated content items generated within the past 7 days; and $AL_7$ is a number of content items using the audio library within the past 7 days. In this example, the popularity score is based on signals associated with content items generated within the past 24 hours or within the past 7 days, and therefore, the signals satisfy a 7 day recency threshold. The content items generated within the past 24 hours (i.e., $UGC_{24}$ and $AL_{24}$) are weighed greater than the content items generated within the past 7 days (i.e., $UGC_7$ and $AL_7$). Many variations, including use of different weight values, are possible. In some cases, a ranking of music can be based on production signals, consumption signals, and engagement signals associated with a geographic region (e.g., country, state, city, etc.). For example, the geographic region can be a geographic region associated with a user to whom a music chart is to be presented. The geographic region associated with the user can be a geographic location, for example, entered by the user in relation to the user's profile on a social networking system, corresponding to a check in performed by the user, or determined by GPS functionality of a computing device associated with the user, to name a few examples. The ranking can be based on the production signals, consumption signals, and engagement signals associated with users in the geographic region. For example, a song can be associated with 100,000 content items created by users associated with a first region, 500,000 instances of access by users associated with the first region, and 1,000,000 likes from users associated with the first region. The song can also be associated with 50,000 content items created by users associated with a second region, 100,000 instances of access by users associated with the second region, and 200,000 likes from users associated with the second region. Accordingly, the song can have a higher popularity score associated with the first region than with the second region. Many variations are possible.

In various embodiments, the chart module 108 can generate a music chart and support interactions associated with the music chart. The music chart can be based on a ranking of music. The music can include audio content items (e.g., songs). The music chart can present information associated with the music. The information can include, for example, song titles and artist names associated with the music. The chart module 108 can also allow interactions associated with the music chart. The interactions can include, for example, sharing a song or generating a new content item based on the song. More details regarding the chart module 108 will be provided with reference to FIG. 2.

Figure 2:
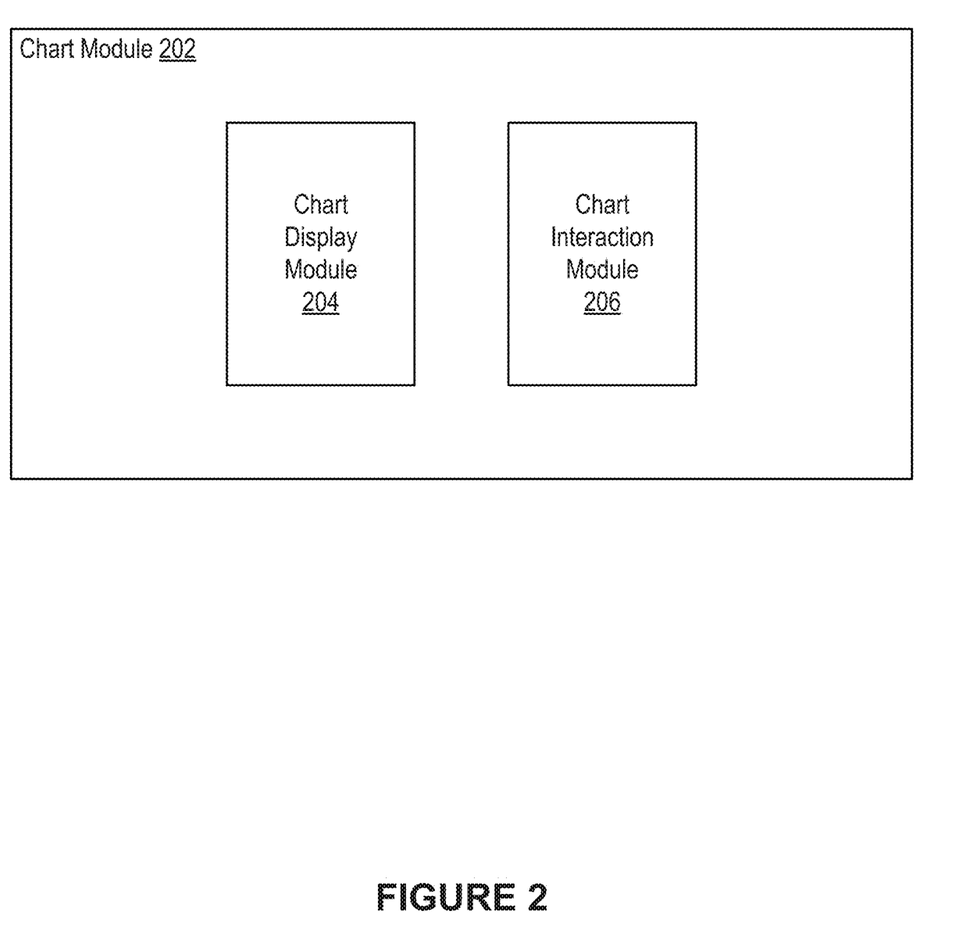
FIG. 2 illustrates an example chart module, according to an embodiment of the present technology.

FIG. 2 illustrates an example chart module 202 configured to generate a music chart and allow user interactions associated with the music chart, according to an embodiment of the present technology. In some embodiments, the chart module 108 of FIG. 1 can be implemented as the chart module 202. As shown in FIG. 2, the chart module 202 can include a chart display module 204 and a chart interaction module 206.

The chart display module 204 can generate a music chart associated with a ranking of music. A music chart can provide a listing of songs ranked based on popularity. The music chart can provide information associated with each song in the listing of songs. The information can include a respective rank, song title, and artist name associated with each song. The information can also include trends relating to a rank associated with a song. The trends can include, for example, whether a rank associated with a song is rising, falling, to what degree the rank is rising or falling, and a highest rank associated with the song. The information can also include social connection information associated with a user to whom the music chart is provided. For example, a music chart can display profile images associated with users who like (endorse) a song and who have a social connection with a user to whom the music chart is provided. A music chart can also provide various calls-to-action associated with interactions with the music chart. The calls-to-action can include, for example, options for posting a song and sharing the song. A music chart can also provide for actions that a user can take in relation to a song, such as playing a clip of the song, accessing a page associated with the song, accessing a page associated with an artist associated with the song, and accessing posts associated with the artist. Many variations are possible.

The chart interaction module 206 can provide interactions associated with a music chart. Interactions associated with a music chart can include, for example, posting a song, sharing the song, playing a clip of the song, accessing a page associated with the song, accessing a page associated with an artist associated with the song, and accessing posts associated with the artist. In some cases, posting a song or sharing the song can involve generating a new content item based on the song. The new content item can incorporate the song, or a portion of the song, and an image, such as an album art image associated with the song, a stock image, or a user submitted image. In some cases, the new content item can incorporate the song, or a portion of the song, and a video, such as a user submitted video. Posting a song can involve posting a new content item based on the song, and sharing a song can involve sharing a new content item based on the song. Songs and portions of songs used in generating a new content item can be selected by a user from an audio library. For example, a user can access a music chart and click (or tap) on a call-to-action to post a song to a profile associated with the user. The user can be prompted to submit or select a desired image or video. In this example, the user can submit a video, and a new content item can be generated based on the video and the song. A portion of the song can be selected by the user from an audio library, and a length (duration) of the portion of the song can be based on (e.g., selected to be equal to) a length (duration) of the submitted video. The new content item can be posted to the profile associated with the user. Many variations are possible.

Figure 3:
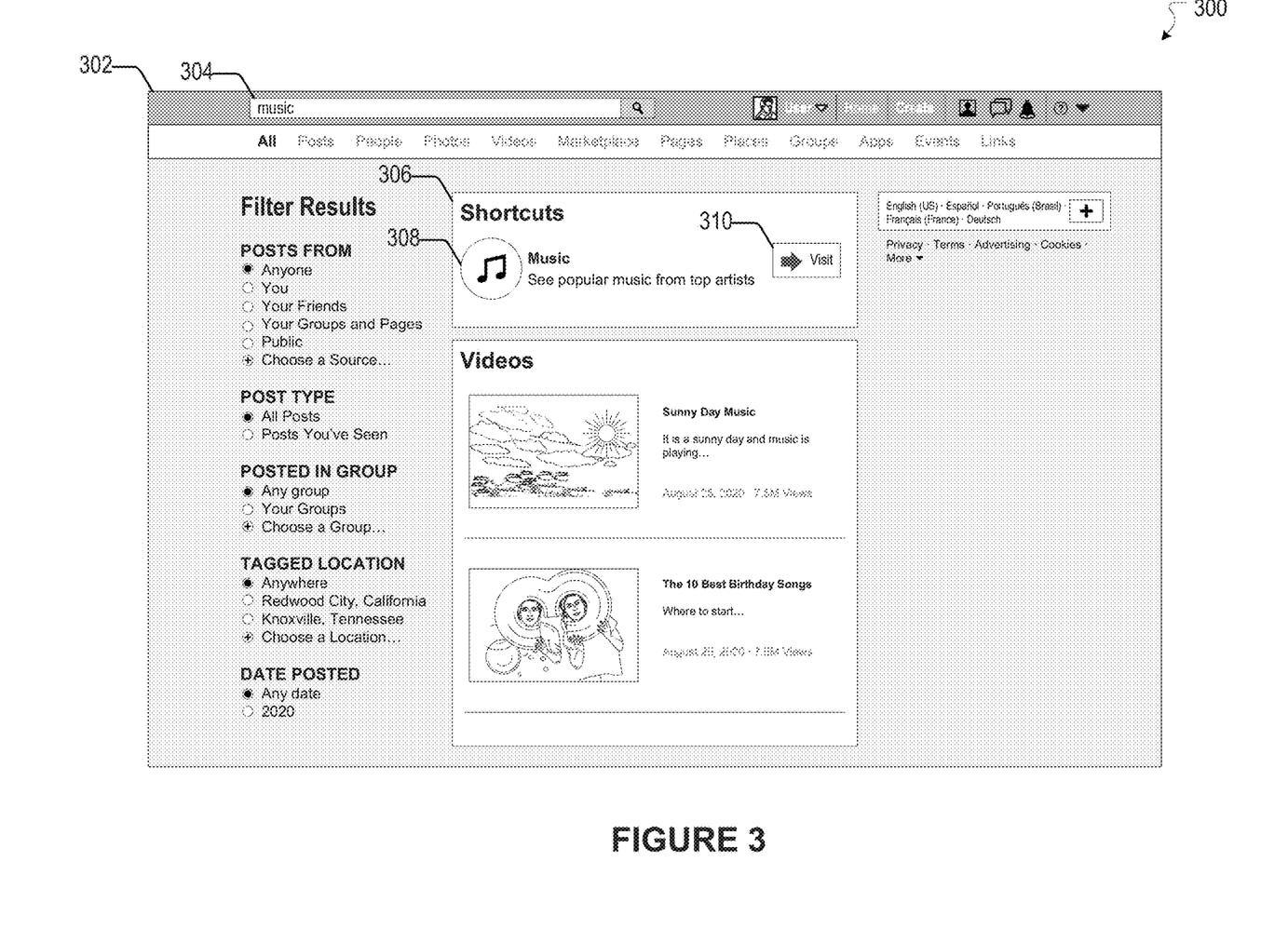
FIG. 3 illustrates an example interface, according to an embodiment of the present technology.

FIG. 3 illustrates an example interface 300, according to an embodiment of the present technology. The example interface 300 can be generated and supported by the music chart module 102. The example interface 300 can be presented through a display screen of a computing device of a user. The example interface 300 can be provided through an application (e.g., a web browser, a social network application, a messaging application, etc.) running on the computing device.

In this example, the example interface 300 presents a search page 302 associated with a social networking system. The search page 302 presents search results based on a search performed using a search term "music," which constitutes a trigger word, in a search bar 304. Other search terms constituting trigger words also can be entered in the search bar 304. Based on the search term being a trigger word, a shortcut 306 is included in the search results. The shortcut 306 includes a message 308 ("See popular music from top artists") that invites the user to take action to access popular music from top musical artists. The shortcut also includes a link 310. The link 310 can allow for navigation to a page presenting a music chart. All examples herein are provided for illustrative purposes, and there can be many variations and other possibilities.

Figure 4:
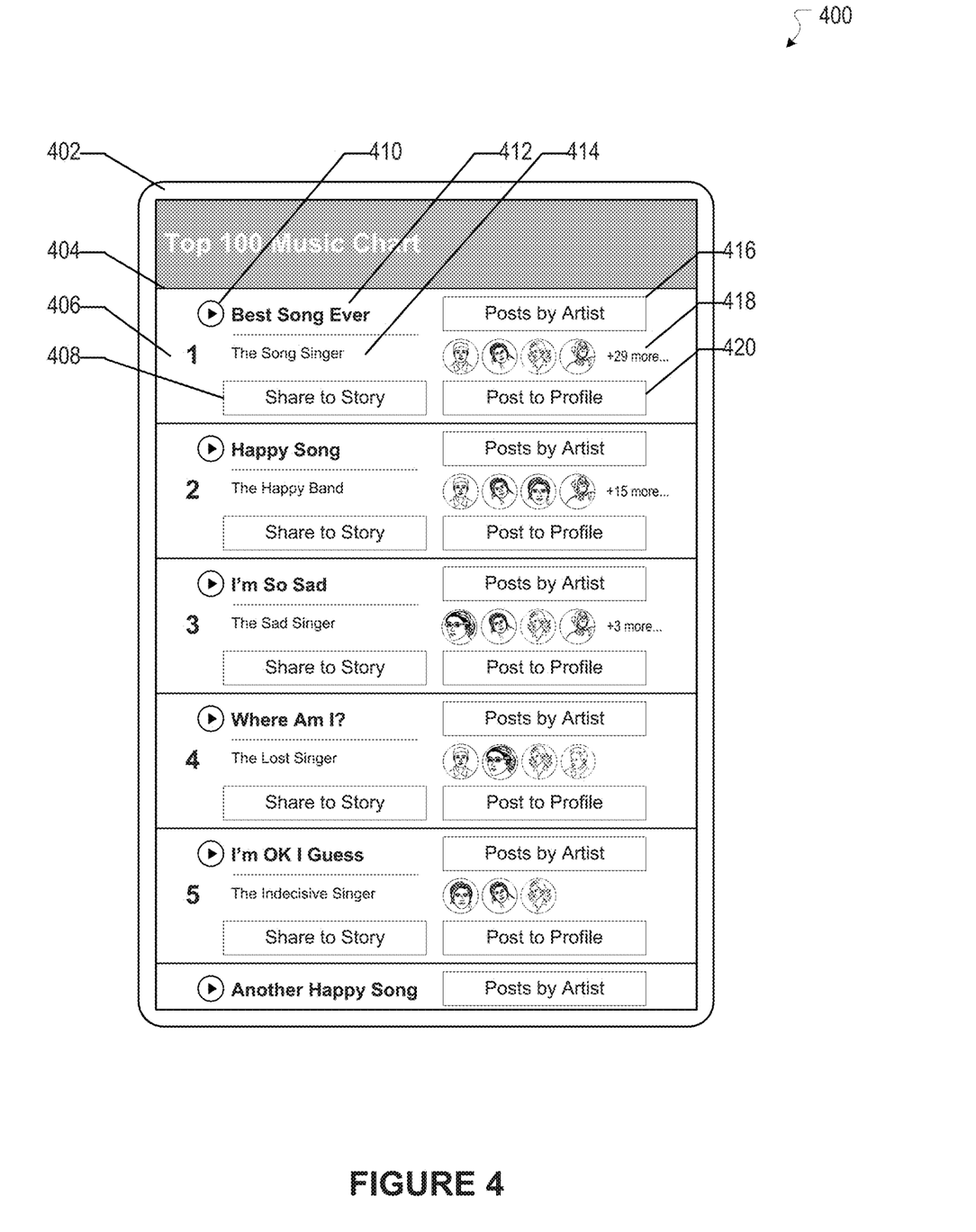
FIG. 4 illustrates an example interface, according to an embodiment of the present technology.

FIG. 4 illustrates an example interface 400, according to an embodiment of the present technology. The example interface 400 can be generated and supported by the music chart module 102. The example interface 400 can be presented through a display screen of a computing device. The example interface 400 can be provided through an application (e.g., a web browser, a social network application, a messaging application, etc.) running on the computing device.

In this example, the example interface 400 presents a music chart 402. The music chart 402 includes a ranking of 100 songs of which five songs are shown. The 100 songs are listed in descending order based on the ranking. The first listing 404 displays information associated with the highest ranked song in the music chart. The first listing 404 displays a song title 412 "Best Song Ever" associated with the song. The first listing 404 also displays an artist name 414 "The Song Singer" associated with the song. The first listing 404 further displays social connection information 418 associated with a user to whom the music chart 402 is presented. In this example, the social connection information indicates that a total of 33 social connections associated with the user have liked or otherwise engaged with the song. The first listing 404 also displays various interactions that a user can take in relation to the song. The actions include a play button 410 that can facilitate playing a portion of the song. The actions also include a "Posts by Artist" button 416. The "Posts by Artist" button 416 can provide access to posts by the artist associated with the song. The first listing 404 further displays various calls-to-action. The calls-to-action include a "Share to Story" call-to-action 408. The "Share to Story" call-to-action 408 can provide for generating a new content item based on the song and sharing the new content item to a story associated with the user. The calls-to-action further include a "Post to Profile" call-to-action 420. The "Post to Profile" call-to-action 420 can provide for generating a new content item based on the song and posting the new content item to a profile associated with the user. All examples herein are provided for illustrative purposes, and there can be many variations and other possibilities.

Figure 5:
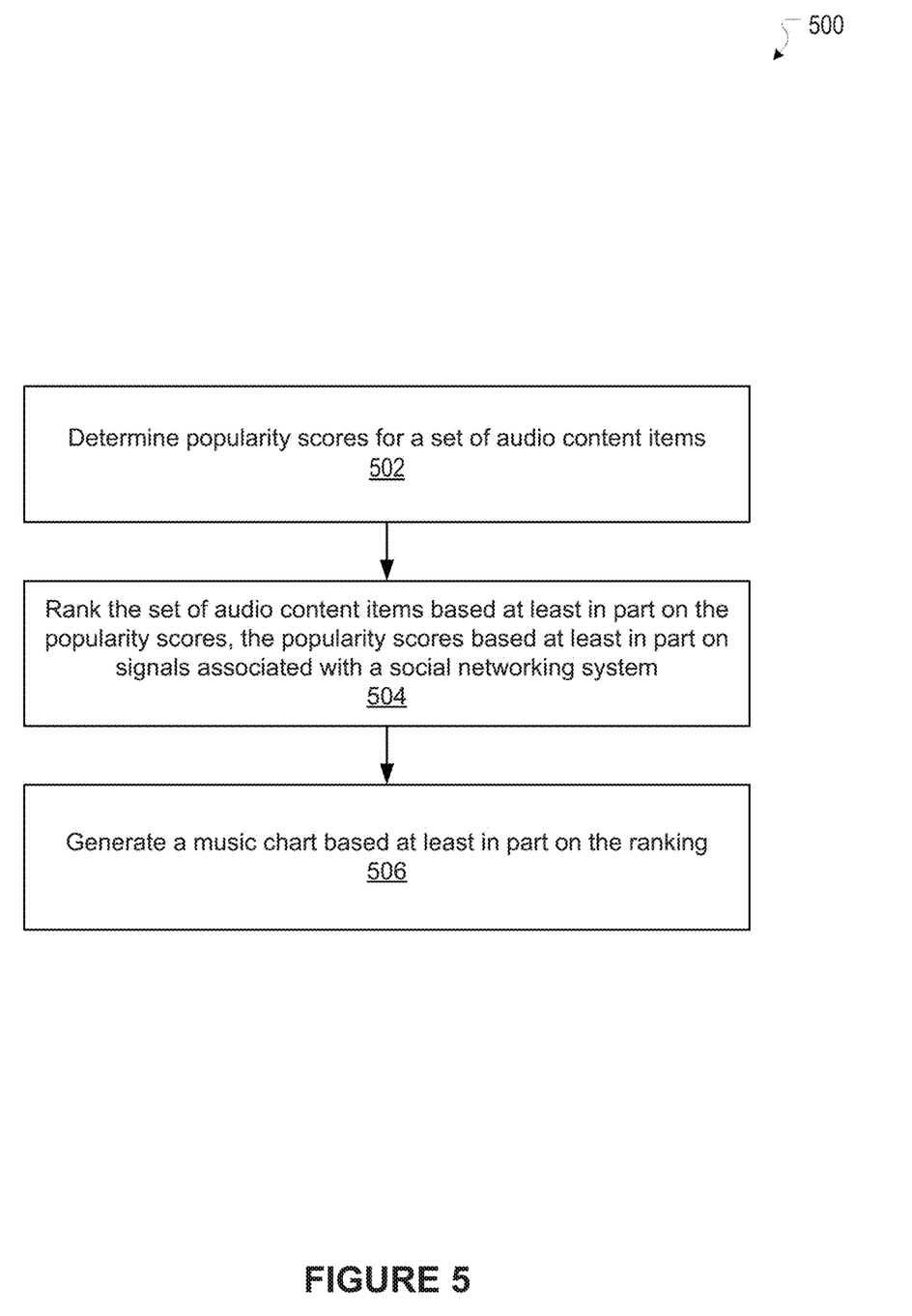
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 determines popularity scores for a set of audio content items. At block 504, the example method 500 ranks the set of audio content items based at least in part on the popularity scores. At block 506, the example method 500 generates a music chart based at least in part on the ranking.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
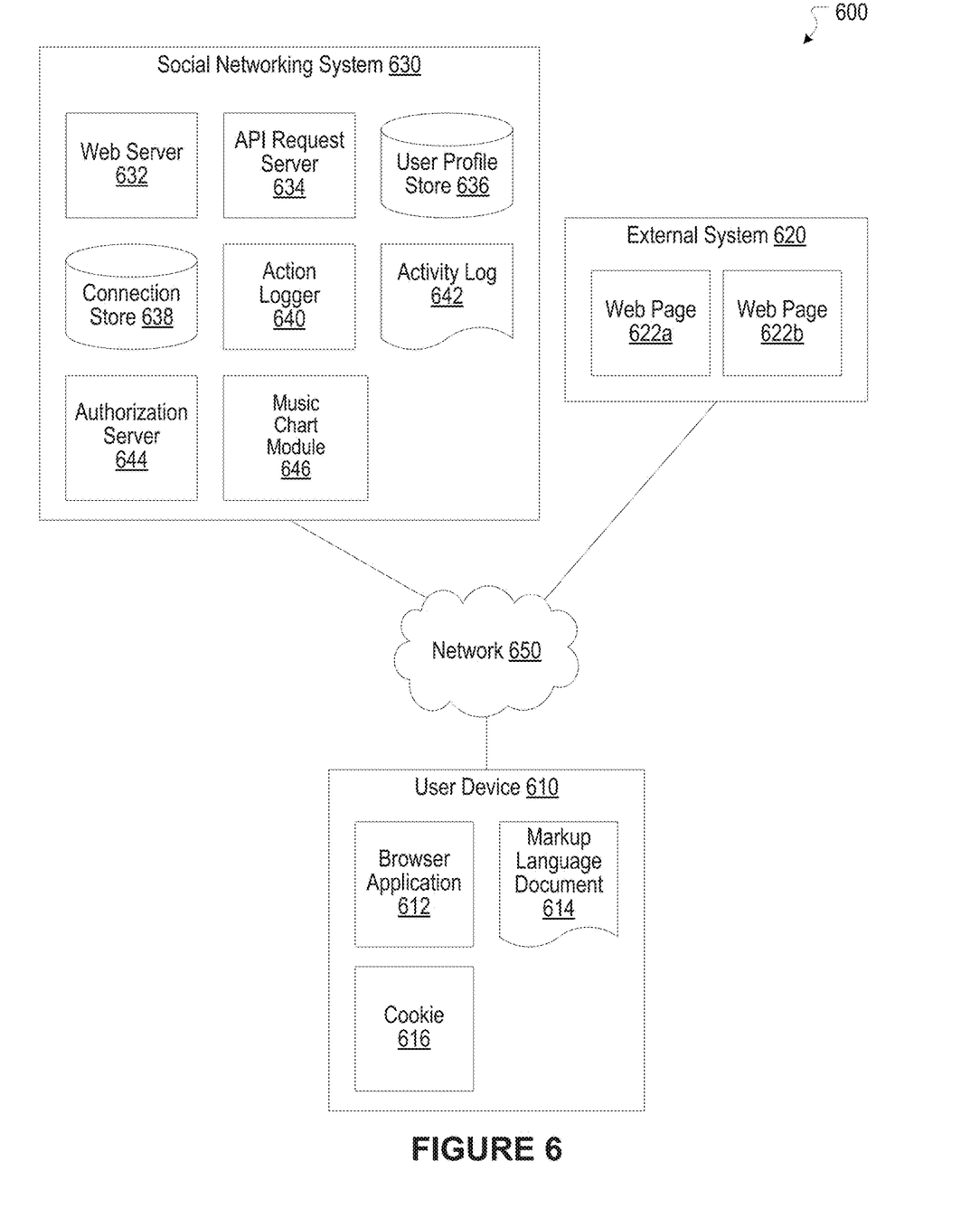
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML).

In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a music chart module 646. The music chart module 646 can, for example, be implemented as the music chart module 102, as discussed in more detail herein. As discussed previously, it should be appreciated that there can be many variations or other possibilities. For example, in some embodiments, one or more functionalities of the music chart module 646 can be implemented in the user device 610. As discussed previously, it should be appreciated that there can be many variations or other possibilities.

Hardware Implementation

Figure 7:
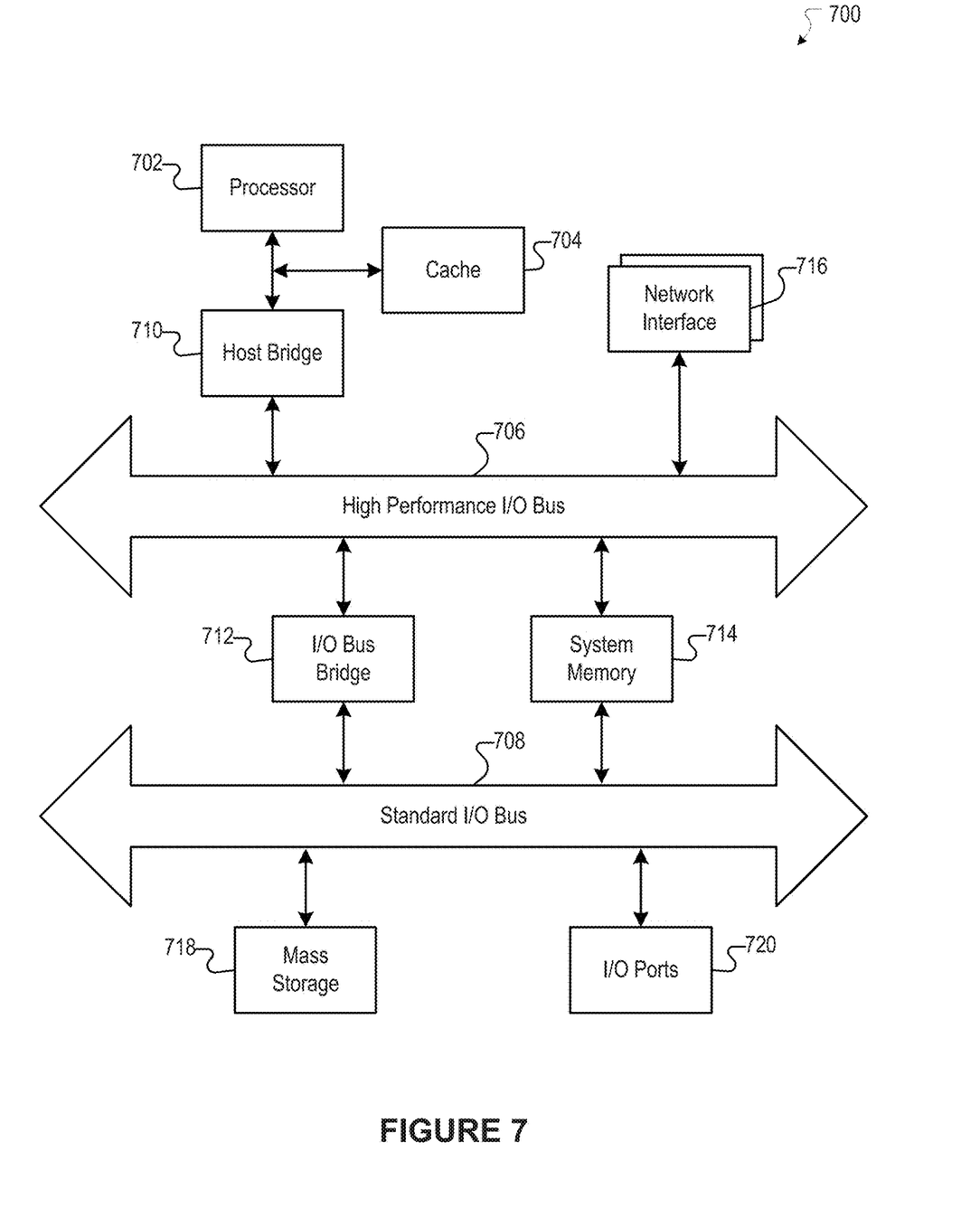
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, popularity scores for a set of audio content items based at least in part on signals associated with a system, wherein the signals include production signals that are based at least in part on durations of audio content items of the set of audio content items included in created content items;
    ranking, by the computing system, the set of audio content items based at least in part on the popularity scores;
    generating, by the computing system, a music chart for a user based at least in part on the ranking, wherein the music chart includes interactions for accessing at least one of: pages associated with the set of audio content items, pages of artists associated with the set of audio content items, or posts of the artists associated with the set of audio content items;
    determining, by the computing system, an interaction with an audio content item of the set of audio content items in the music chart; and
    generating, by the computing system, a media content item based at least in part on the audio content item and a video content item provided by the user.

2. The computer-implemented method of claim 1, wherein the signals associated with the system further include at least one of: consumption signals or engagement signals associated with the set of audio content items.

3. The computer-implemented method of claim 1, wherein the production signals are further based at least in part on numbers of the created content items associated with the set of audio content items.

4. The computer-implemented method of claim 2, wherein the consumption signals are based at least in part on numbers of instances of access of content items associated with the set of audio content items.

5. The computer-implemented method of claim 2, wherein the engagement signals are based at least in part on numbers of comments associated with content items associated with the set of audio content items.

6. The computer-implemented method of claim 2, wherein the popularity scores are further based at least in part on weights relating to at least one of: time factors or signal type factors.

7. The computer-implemented method of claim 1, further comprising:
    generating, by the computing system, a shortcut that provides access to the music chart, wherein the shortcut is generated based at least in part on a search involving a trigger word.

8. The computer-implemented method of claim 1, wherein the music chart includes social connection information associated with a user.

9. The computer-implemented method of claim 1, wherein the generating the media content item comprises:
    providing, by the computing system, a prompt for the user to select the video content item; and
    selecting, by the computing system, a length of a portion of the audio content item based on a length of the video content item.

10. The computer-implemented method of claim 1, wherein the ranking is further based at least in part on a geographic region.

11. A computing system comprising:
    at least one processor; and
    a memory storing instructions that, when executed by the at least one processor, cause the computing system to perform a method comprising:

determining popularity scores for a set of audio content items based at least in part on signals associated with a system, wherein the signals include production signals that are based at least in part on durations of audio content items of the set of audio content items included in created content items;

ranking the set of audio content items based at least in part on the popularity scores;

generating a music chart based at least in part on the ranking, wherein the music chart includes interactions for accessing at least one of: pages associated with the set of audio content items, pages of artists associated with the set of audio content items, or posts of the artists associated with the set of audio content items;

determining an interaction with an audio content item of the set of audio content items in the music chart; and generating a media content item based at least in part on the audio content item and a video content item provided by the user.

12. The system of claim 11, wherein the signals associated with the system further include at least one of: consumption signals or engagement signals associated with the set of audio content items.

13. The system of claim 11, wherein the production signals are further based at least in part on numbers of the created content items associated with the set of audio content items.

14. The system of claim 12, wherein the consumption signals are based at least in part on numbers of instances of access of content items associated with the set of audio content items.

15. The system of claim 12, wherein the engagement signals are based at least in part on numbers of comments associated with content items associated with the set of audio content items.

16. A non-transitory computer-readable storage medium including instructions that, when executed by at least one processor of a computing system, cause the computing system to perform a method comprising:

determining popularity scores for a set of audio content items based at least in part on signals associated with a system, wherein the signals include production signals that are based at least in part on durations of audio content items of the set of audio content items included in created content items;

ranking the set of audio content items based at least in part on the popularity scores; and generating a music chart based at least in part on the ranking, wherein the music chart includes interactions for accessing at least one of: pages associated with the set of audio content items, pages of artists associated with the set of audio content items, or posts of the artists associated with the set of audio content items;

determining an interaction with an audio content item of the set of audio content items in the music chart; and generating a media content item based at least in part on the audio content item and a video content item provided by the user.

17. The non-transitory computer-readable storage medium of claim 16, wherein the signals associated with the system further include at least one of: consumption signals or engagement signals associated with the set of audio content items.

18. The non-transitory computer-readable storage medium of claim 17, wherein the production signals are further based at least in part on numbers of the created content items associated with the set of audio content items.

19. The non-transitory computer-readable storage medium of claim 17, wherein the consumption signals are based at least in part on numbers of instances of access of content items associated with the set of audio content items.

20. The non-transitory computer-readable storage medium of claim 17, wherein the engagement signals are based at least in part on numbers of comments associated with content items associated with the set of audio content items.

* * * * *